United States Patent
Hailey

(12) 
(10) Patent No.: US 6,215,951 B1
(45) Date of Patent: *Apr. 10, 2001

(54) AUTOMATIC TITLE OR DESCRIPTION CAPTIONING FOR A VCR RECORDING

(75) Inventor: James Edwin Hailey, Indianapolis, IN (US)

(73) Assignee: Thomson Licensing S.A., Boulogne (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/706,074

(22) Filed: Aug. 30, 1996

(51) Int. Cl.⁷ .................................................. H04N 5/76
(52) U.S. Cl. .................................. 386/83; 386/95
(58) Field of Search .................... 386/83, 95; 348/906; H04N 5/76, 5/782

(56) References Cited

U.S. PATENT DOCUMENTS

| | | | |
|---|---|---|---|
| 5,307,172 | * | 4/1994 | Oh .................................. 386/95 |
| 5,390,027 | * | 2/1995 | Henmi et al. ................... 386/83 |
| 5,479,268 | * | 12/1995 | Young et al. ................... 386/83 |
| 5,488,409 | * | 1/1996 | Yuen et al. ..................... 386/83 |
| 5,541,738 | * | 7/1996 | Mankovitz ...................... 386/83 |
| 5,546,191 | * | 8/1996 | Hibi et al. ...................... 386/95 |
| 5,621,579 | * | 4/1997 | Yuen .............................. 386/95 |

FOREIGN PATENT DOCUMENTS

| | | | | |
|---|---|---|---|---|
| 0322909A2 | * | 7/1989 | (EP) | H04N/5/82 |
| 665551A1 | | 8/1995 | (EP) | G11B/27/28 |
| WO9511567 | | 4/1995 | (WO) | H04N/5/76 |

* cited by examiner

*Primary Examiner*—Huy Nguyen
(74) *Attorney, Agent, or Firm*—Joseph S. Tripoli; Paul P. Kiel

(57) ABSTRACT

In a television system in which at least program title information for programs which are to be transmitted in the future is transmitted in advance to form a channel guide listing, apparatus is provided for acquiring one of the title information and the current date, and generating display signal comprising data representing a text screen containing one of the title information and the current date for recording a user-viewable screen display on a video tape ahead of the television program signal. The title or date information acting as a leader to the following television program. In a second embodiment of the invention, in those instances where descriptive text accompanies the program listing, apparatus of the invention records the descriptive text relating to the title, the star, the director, or the context of the program.

14 Claims, 5 Drawing Sheets

| CH 150 | Program Guide | | | 7:05pm | |
|---|---|---|---|---|---|
| | 7:00pm | 7:30pm | 8:00pm | 8:30pm | |
| HBO 102 | OTHER PEOPLE'S MONEY | | FREE PREVIEW | DREAM ON | ←100 |
| CBS 106 | EVENING NEWS | HOME IMPROVEMENT | BROOKLYN BRIDGE | RAVEN | |
| UPN 123 | STAR TREK: VOYAGER | | ENTERTAINMENT TONIGHT | WORLD NEWS | |
| CINE 210 | EYEWITNESS | FUN CITY | | DOUBLE TROUBLE | |
| CNN 305 | PRIME NEWS | BOTH SIDES | RELIABLE SOURCES | HOME AND GARDEN | |
| USA 422 | COUNTER STRIKE | | QUANTUM LEAP | | |
| MORE | MOVIES | SPORTS | OTHER | ALL | EXIT |

Fig. 1

| CH 150 | Progra| | | | |
|---|---|---|---|---|---|
| | 7:00pm | | | | |
| HBO 102 | OTHER PEOPLE'S MONEY | | | | |
| CBS 106 | EVENING NEWS | FR/ TU| | | |
| UPN 123 | STAR TREK: VOYAGER | | ENTERTAINMENT TONIGHT | | RAVEN |
| CINE 210 | EYEWITNESS | FUN CITY | | | WORLD NEWS |
| CNN 305 | PRIME NEWS | BOTH SIDES | RELIABLE SOURCES | | DOUBLE TROUBLE |
| USA 422 | COUNTER STRIKE | | QUANTUM LEAP | | |
| MORE | MOVIES | SPORTS | OTHER | ALL | EXIT |

TITLE:    STAR  TREK:    VOYAGER
STARRING:    KATE MULGREW
START TIME: MON.  7:00  PM
CHANNEL:    123
RATING:    G

PROGRAM DESCRIPTION:
    THE CREW ENCOUTERS A NEW AND HOSTILE LIFEFORM IN INTERSTELLAR SPACE.

AUTOMATIC TITLE OR DESCRIPTION CAPTIONING FOR A VCR RECORDING

FIELD OF THE INVENTION

The subject invention concerns the field of VCRs and television program schedulers.

BACKGROUND OF THE INVENTION

Many viewers record television programs for playback at a more convenient time. This practice is commonly-known as "time-shifting". Unfortunately, many people nowadays have little free time in their hectic schedules to spend watching these tapes. Consequently, a sizable stack of tapes containing such time-shifted recordings can accrue before the viewer plays them. In the best of all possible worlds, the viewer would have labelled the outside of each tape with the title and date of the recorded television program. In actual practice, however, there is little chance that one is so organized. Consequently, a viewer may have accumulated three or four tapes, each containing an episode of a favorite show and, in the absence of neatly labeled tapes, the viewer must then play a portion of each tape to see if it is the desired episode.

Many camcorders include electronic titling circuitry including a keyboard for adding a text screen overlay to the image being recorded, so that the user can record a title along with the video. However, given the fact that many viewers do not even label their tapes, it is highly unlikely that a viewer would use such a time-consuming and tedious feature to title each tape electronically. Moreover, electronic titling by use of a keyboard is contrary to the current trend in the industry of making the recording of a television program a quick and easy procedure

SUMMARY OF THE INVENTION

In a television system in which at least program title information for programs which are to be transmitted in the future is transmitted in advance to form a channel guide listing, apparatus is provided for acquiring at least one of the title information and the current date, and generating display signal comprising data representing a text screen containing at least one of the title information and the current date for recording a user-viewable screen display on a video tape ahead of the television program signal. The user-viewable title or date information then acts as a leader to the following television program. In a second embodiment of the invention, in those instances where descriptive text accompanies the program listing, apparatus of the invention records the descriptive text relating to the title, the star, the director, or the context of the program.

BRIEF DESCRIPTION OF THE DRAWING

FIG. 1 is an illustration of a screen display of a portion of a typical channel guide, as known from the prior art.

FIG. 2 is an illustration of a screen display showing an auxiliary text description associated with a particular program guide entry as known from the prior art.

DETAILED DESCRIPTION OF THE INVENTION

Television systems such as the RCA® DSS® direct broadcast satellite system and Starsight® transmit channel guides for display on the television receivers of subscribers. FIG. 1 shows a Program Guide screen display produced, for example, by an RCA® DSS® direct broadcast satellite receiver system, manufactured by Thomson Consumer Electronics, Inc. Indianapolis, Ind. A user selects a television program from a Program Guide 100 for viewing, by moving a cursor (via operation of remote control up, down, right, and left, direction control keys, not shown) to a block of the program guide screen display which contains the name of the desired program. When a RECORD key of the remote control is pressed, the current x and y position of the cursor is evaluated to derive virtual channel and program time information. In this example, a particular television show, STAR TREK: VOYAGER has been highlighted for selection by use of the cursor keys on a remote control unit (e.g., 450R of FIG. 4). The highlighting is illustrated by the dark box outlining the title in FIG. 1. Upon pressing the RECORD key, the relevant programming data is transferred to a programming unit such as VCR 402 of FIG. 4. This procedure is commonly known as one-touch recording.

In FIG. 2, a text box 210 is displayed on top of Program Guide 200. Text box 210 contains a title, time, channel, and date information and may also contain a description of the highlighted program. This information is derived from auxiliary information signals transmitted with the program signals. In terrestrial systems, such as Starsight®, it is transmitted during the vertical blanking interval. In the DSS® satellite system, it is transmitted in data packets along with the program guide information, description information packets, and program data.

Figure 3:
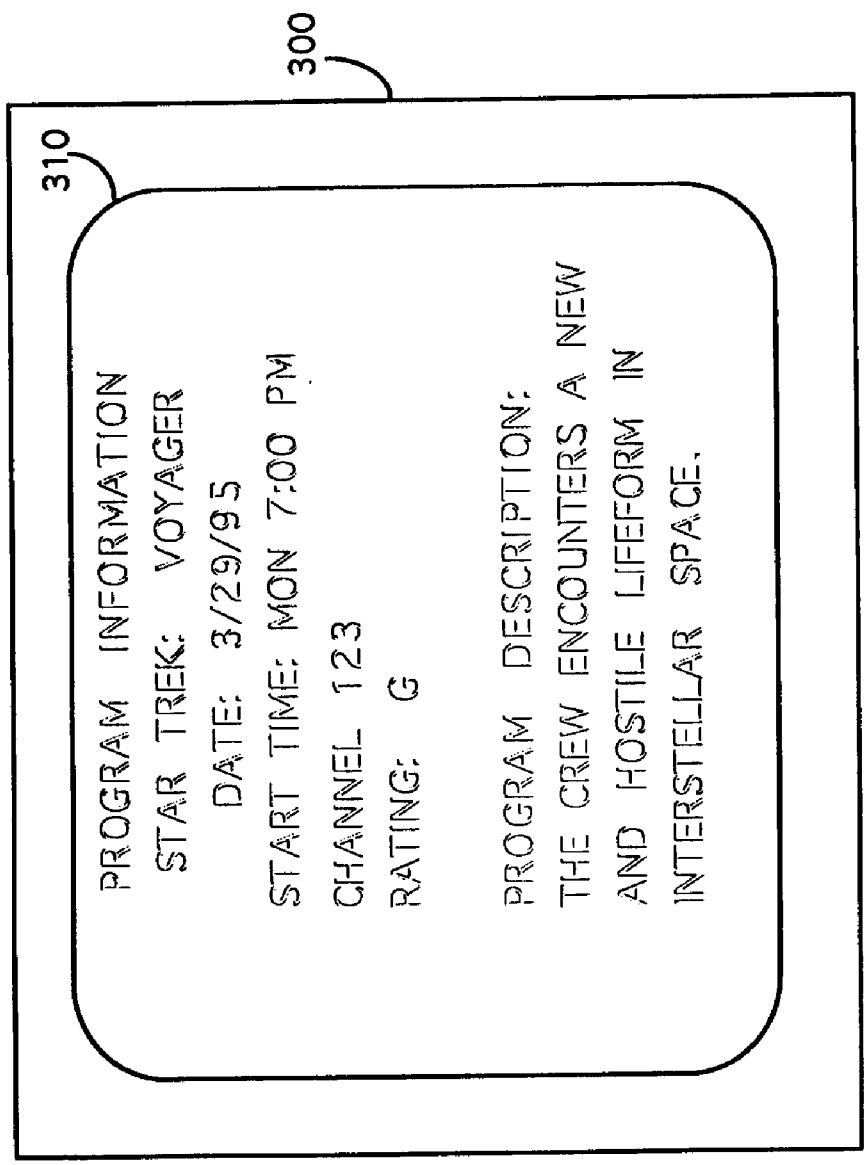
FIG. 3 is an illustration of a titling screen display in accordance with the subject invention.

The subject invention recognizes that this auxiliary information can be used to form a "tape leader" for the program to be recorded. In this way, the program title and date are recorded onto the tape as a user-readable OSD display ahead of the desired television program. FIG. 3 shows such a screen display 310 being displayed on the screen of a television receiver 300 during playback, just before the start of the recorded program. The display comprises program information such as, title, date, start time, channel, rating, and may also include a description of the program. While it is not necessary to record all of this information, it is preferable that at least title information or at least date information be used to form the program information screen. For example, it may be easy to identify an episode from a given television series (e.g. Star Trek), and all that is necessary for further identification is to display the date on which the episode was recorded. On the other hand, it is also herein recognized that in some instances additional content-descriptive text may be helpful to the viewer in identifying the television program recorded on the videotape.

Figure 4:
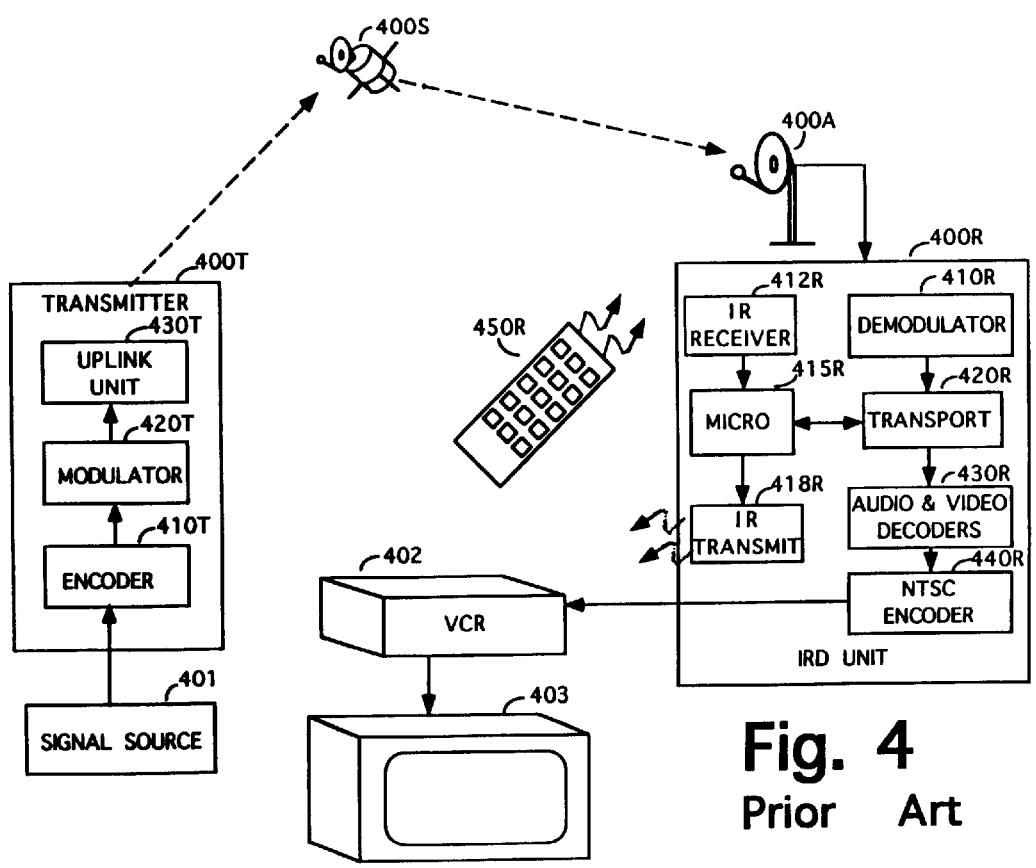
FIG. 4 is an illustration in block diagram form of apparatus suitable for practicing the invention.

As noted above, the channel guide data used by the controller of the subject apparatus may be received from a satellite television communication system, or from standard terrestrial broadcasts. FIG. 4 shows such a satellite television communication system in which, a satellite 400S receives a signal representing audio, video, or data information from an earth-based transmitter 400T. The satellite amplifies and rebroadcasts this signal to a plurality of receivers 400R, located at the residences of consumers, via transponders operating at specified frequencies and having given bandwidths. Such a system includes an uplink transmitting portion (earth to satellite), an earth-orbiting satellite receiving and transmitting unit, and a down-link portion (satellite to earth) including a receiver located at the user's residence.

In a such a satellite system, the information necessary to select a given television program is not fixedly-programmed into each receiver but is rather is down-loaded from the satellite continually on each transponder. The television program selection information comprises a set of data known as a Master Program Guide (MPG), which relates television program titles, their start and end times, a virtual channel number to be displayed to the user, and information allocating virtual channels to transponder frequencies and to a position in the time-multiplexed data stream transmitted by a particular transponder. In such a system, it is not possible to tune any channel until the first master program guide is received from the satellite, because until receiving the guide, the receiver (IRD, or Integrated Receiver Decoder) literally does not know the location of any channel, in terms of frequency and position (i.e. data time slot) within the data stream of any transponder.

A master program guide is preferably transmitted on all transponders with the television program video and audio data, and is repeated periodically, for example, every 2 seconds. The master program guide, once received, is maintained in a memory unit in the receiver, and updated periodically, for example every 30 minutes. Retention of the master program guide allows instantaneous television program selection because the necessary selection data are always available. If the master program guide were to be discarded after using it to select a television program, then a delay of at least two seconds would be incurred while a new program guide was acquired, before any further television program selections could be performed.

Once the channel transponder carrying a desired television program is tuned, the data packets containing the audio and video information for that program can be selected from the data stream received from the transponder by examining the data packets for the proper SCID (Service Component Identifier) 12 bit code. If the SCID of the currently received data packet matches the SCID of the desired television program as listed in the program guide, then the data packet is routed to the proper data processing sections of the receiver. If the SCID of a particular packet does not match the SCID of the desired television program as listed in the program guide, then that data packet is discarded.

A brief description of system hardware, suitable for implementing the above-described invention, now follows. In FIG. 4, a transmitter 400T processes a data signal from a source 401 (e.g., a television signal source) and transmits it to a satellite 400S which receives and rebroadcasts the signal to a receiving antenna 400A which applies the signal to a receiver 400R. Transmitter 400T includes an encoder 410T, a modulator (i.e., modulator/forward error corrector (FEC)) 420T, and an uplink unit 430T. Encoder 410T compresses and encodes signals from source 401 according to a predetermined standard such as MPEG. MPEG is an international standard developed by the Moving Picture Expert Group of the International Standards Organization for coded representation of moving pictures and associated audio stored on digital storage medium. An encoded signal from unit 410T is supplied to modulator/Forward Error Corrector (FEC) 420T, which encodes the signal with error correction data, and Quaternary Phase Shift Key (QPSK) modulates the encoded signal onto a carrier.

Uplink unit 430T transmits the compressed and encoded signal to satellite 400S, which broadcasts the signal to a selected geographic reception area. The signal from satellite 400S is received by an antenna dish 400A coupled to an input of a so-called set-top receiver 400R (i.e., an interface device situated atop a television receiver). Receiver 400R includes a demodulator (demodulator/Forward Error Correction (FEC) decoder) 410R to demodulate the signal and to decode the error correction data, an IR receiver 412 for receiving IR remote control commands, a microprocessor 415R, which operates interactively with demodulator/FEC unit 410R, and a transport unit 420R to transport the signal to an appropriate decoder 430R within unit 400R depending on the content of the signal, i.e., audio or video information. An NTSC Encoder 440R encodes the decoded signal to a format suitable for use by signal processing circuits in a standard NTSC consumer VCR 402 and standard NTSC consumer television receiver 403. Microprocessor (or microcontroller, or microcomputer) 415R receives infrared (IR) control signals from remote control unit 450R, and sends control information to VCR 402 via an IR link 418R. Microprocessor 415R also generates the on-screen display (OSD) signals needed for presenting the interactive sentence, or confirmation sentence, to the user. Microprocessor 415R also receives and interprets cursor key X and Y information in order to control the highlighting of user choices in the on-screen displays.

Figure 5:
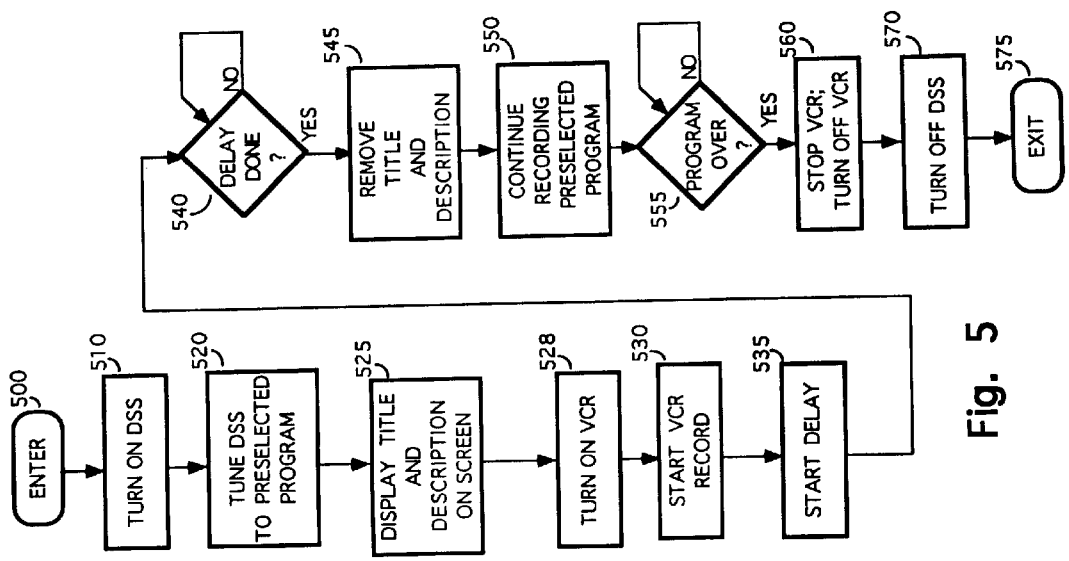
FIG. 5 is a flow chart illustrating an automatic titling process suitable for use in the subject invention.

FIG. 5 is a flowchart showing the operation of the controller (for example microcontroller 415R of DSS receiver 400R) a few moments before the designated recording time of a desired television program. The routine is entered at step 500. At step 515 a command is sent to VCR 402 (by IR signal or over a control bus) to turn-on the VCR. At step 520, the DSS circuitry is controlled to selects the proper television program (i.e., select the proper signal from the correct satellite, from the correct transponder, and from the correct time slot in the data stream). At step 525, a title and description screen display is prepared and output to VCR 402 and television receiver 403. The title and description screen will be displayed on the screen of television receiver 403 if television receiver 403 happens to be turned-on. At step 528 the DSS unit is turned-on (i.e., powered-up from a standby state, if necessary). At step 530, VCR 402 is controlled to start recording. What will be recorded at this time is the title and description screen generated by DSS receiver 400R. At steps 535 and 540, a delay is executed for an appropriate time period to allow the user to read the title and description screen when the tape is played back. At step 545, the title and description screen is removed to allow for the recording of the desired television program. The recording will continue through steps 550 and 555 until the program is over. At step 560 the VCR is controlled to stop recording and turn off. At step 570, DSS receiver 400R is turned off, and the routine is exited at step 575.

Thus, there has been described an apparatus for automatically titling a recording on a video tape, which requires no action on the part of the viewer, other than selecting the program to be recorded. It is important to note that the recorded title information is user-readable when the tape is played back. While the system has been described with respect to one touch recording, it is equally applicable to timer recording, because the DSS® system or Starsight® system can access the necessary data from a knowledge of time and channel. While the invention has been described with respect to a VCR, any recording device, such as recordable videodisc or storage in electronic memory or on a computer-type disc drive, is envisioned and deemed to lie within the scope of the following claims.

What is claimed is:

1. Apparatus, comprising:
    means for providing an on screen display signal representing program information corresponding to a video program, the on screen display signal being derived from a video program signal representing the video program; and
    means for recording both the on screen display signal and the video program signal on a recording medium in response to a command to record the video program signal, the on screen display signal being recorded to form a leader for the video program signal on the recording medium whereby the on screen display signal and then the video program may be automatically displayed in a continuous playback sequence in response to a user playback command.

2. The apparatus of claim 1, wherein:

the providing means provides first and second on screen display signals representing respective first and second program information for respective first and second video program signal components of the video program signal; and the means for recording records the first and second on screen display signals and the first and second video program signal components on the recording medium in response to a command to record the first and second video program signal components, the first and second on screen display signals being recorded to form respective leaders for the first and second video program signal components.

3. The apparatus of claim 2, wherein the means for recording records on the recording medium, in the order named, the first on screen display signal, the first video program signal component, the second on screen display signal, and the second video program signal component.

4. The apparatus of claim 3, wherein the video program signal is a television program signal, the first and second video program signal components are television program signal components, and the first and second program title information are derived from an auxiliary information signal transmitted with the television program signal.

5. Apparatus comprising:

means for receiving a television program signal and an encoded information signal including program information identifying the television program signal;

means for providing an on screen display signal including the program information from the information signal; and means for automatically recording both the on screen display signal and the television program signal on a recording medium in response to a command to record the video program signal, the on screen display signal being recorded to form a leader for the television program signal on the recording medium whereby the on screen display signal and then the television program signal may be automatically displayed in a continuous playback sequence in response to a user playback command.

6. The apparatus of claim 5, wherein said means for receiving receives a plurality of television program signals, said information signal including program information identifying each of the plurality of television program signals.

7. The apparatus of claim 6, wherein said means for providing provides a plurality of on screen display signals, each including title information for a respective one of the plurality of television program signals.

8. The apparatus of claim 7, wherein said means for automatically recording records a plurality of the on screen display signals and records respective ones of the plurality of television program signals in response to a command to record the ones of the plurality of television program signals each of the plurality of on screen display signals being recorded to form respective leaders for each one of the plurality of television program signals.

9. The apparatus of claim 8, wherein said means for automatically recording records on the recording medium, in the order named, a first one of the plurality of on screen display signals including first program information, a first one of the plurality of television program signals which corresponds to the first program information, a second one of the plurality of on screen display signals including second program information, and a second one of the plurality of television program signals which corresponds to the second program information.

10. A method for recording comprising the steps of:

receiving a television program signal and an information signal including program information identifying the television program signal;

providing an on screen display signal including the program information from the information signal;

receiving a record command signal;

automatically recording both the on screen display signal and the television program signal on a recording medium in response to a command to record the television program signal, the on screen display signal being recorded to form a leader for the television program signal on the recording medium whereby the onscreen display signal and then the television program signal may be automatically displayed in a continuous playback sequence in response to a user playback command.

11. The method of claim 10 wherein the on screen display signal is recorded on the recording medium in a position prior to recording of the television program signal.

12. The method of claim 11, further comprising the steps of:

receiving a second television program signal and a second information signal including program title information identifying the second television program signal; and providing a second on screen display signal including the title information from the second information signal.

13. The method of claim 12, further comprising the step of automatically recording both the second on screen display signal and the second television program signal on the recording medium in response to a command to record the second television program signal, the second on screen display signal being recorded to form a leader for the second television program signal whereby the second on screen display signal and the second television program signal may be displayed in a continuous sequence in response to a second user playback command.

14. The method of claim 13, wherein the on screen display signal is recorded on the recording medium in a position prior to recording of the television program signal and the second on screen display signal is recorded on the recording medium in a position prior to recording of the second television program signal, the second on screen display signal being recorded after recording of the television program signal.

* * * * *